United States Patent
Clemmons et al.

[11] 3,837,443
[45] Sept. 24, 1974

[54] SLACK ADJUSTER FOR HYDRO-PNEUMATIC BRAKE UNIT HAVING AUTOMATIC AIR BLEED

[75] Inventors: Quentin T. Clemmons, Greensburg; Ronald W. Coiner; William B. Jeffrey, both of Irwin; Allen W. Kyllonen, Pittsburgh, all of Pa.

[73] Assignee: Westinghouse Air Brake Company, Wilmerding, Pa.

[22] Filed: Dec. 10, 1973

[21] Appl. No.: 423,405

[52] U.S. Cl.......... 188/196 A, 188/153 R, 188/198
[51] Int. Cl............................................. F16d 65/54
[58] Field of Search............ 188/52, 56, 74, 153 R, 188/196 A, 198; 92/13.1, 13.3, 13.7

[56] References Cited
UNITED STATES PATENTS

| | | | |
|---|---|---|---|
| 2,875,864 | 3/1959 | Kirk | 188/153 R X |
| 3,447,647 | 6/1969 | Stipanovic | 188/153 R |
| 3,517,784 | 6/1970 | Clemmons | 188/196 A |

FOREIGN PATENTS OR APPLICATIONS

| | | | |
|---|---|---|---|
| 700,795 | 2/1932 | France | 188/196 A |
| 648,027 | 8/1937 | Germany | 188/196 A |

Primary Examiner—Duane A. Reger
Attorney, Agent, or Firm—R. W. McIntire, Jr.

[57] ABSTRACT

A slack adjuster device for hydro-pneumatic railway truck-mounted brake units having the slack adjuster mechanism mounted in a vertical disposition relative to the brake unit to provide vertical gravitational flow of fluid from the hydraulic fluid reservoir to the pressure side of the hydraulic piston during the return or release stroke of the piston so that any air inadvertently present in the hydraulic fluid chamber on the pressure side of the hydraulic piston may flow vertically upwardly and escape via an air vent in the hydraulic fluid reservoir.

8 Claims, 1 Drawing Figure

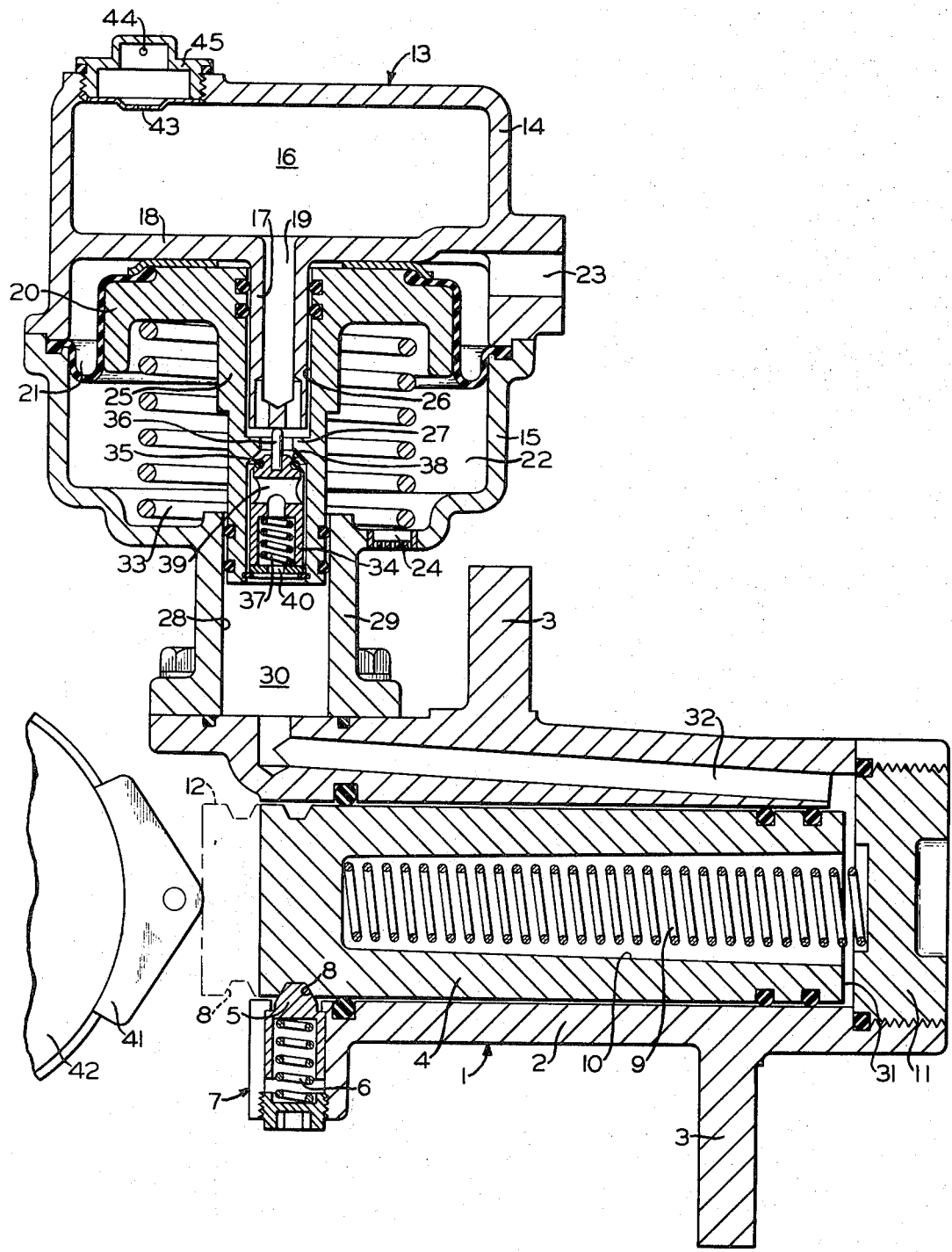

SLACK ADJUSTER FOR HYDRO-PNEUMATIC BRAKE UNIT HAVING AUTOMATIC AIR BLEED

BACKGROUND OF THE INVENTION

In other known slack adjusting devices for hydro-pneumatic brake units of the general type herein disclosed, the slack adjusting mechanism is mounted in a horizontal disposition on the brake unit, and, as such, requires appropriate porting to provide the flow path for make-up hydraulic fluid from the reservoir to the pressure side of the hydraulic piston during the release stroke. Because of the horizontal disposition of the slack adjusting mechanism, air pockets tend to form in the various cavities containing the hydraulic fluid. It becomes necessary, therefore, to provide manually accessible and operable bleed valves in the horizontally disposed slack adjusting devices in order to release the trapped air, notwithstanding that the hydraulic reservoir may be situated in an overhead position on the slack adjusting device.

SUMMARY OF THE INVENTION

The object of this invention is to provide a slack adjusting device of the hydro-pneumatic type so arranged as to prevent entrapment of air pockets in the hydraulic fluid cavities.

Briefly, the invention comprises a hydro-pneumatic brake unit having a slack adjuster device carried thereon in a vertical disposition so that during the brake release stroke, hydraulic fluid from the overhead hydraulic fluid reservoir may flow by natural gravity down through the vertically disposed flow path formed in the piston mechanism, past an unseated check valve to refill the several cavities of the device, while at the same time preventing entrapment of any air in the device, because any air inadvertently present in the hydraulic fluid may rise naturally through the vertically disposed pathway and escape via an air vent formed in the overhead hydraulic reservoir.

The single FIGURE drawing is an elevational view, in section, of hydro-pneumatic railway truck-mounted brake unit embodying the invention.

DESCRIPTION AND OPERATION

As shown in the drawing, the brake unit comprises a power actuator device 1 including a cylindrical casing or cylinder 2 on which are formed conveniently located flanges 3 for mounting the brake unit on a railway vehicle truck (not shown). A power delivery piston 4 is coaxially operably disposed in cylinder 2 and is shown in a retracted position in which repairs to the brake unit, such as replacing worn shoes, may be made. Piston 4 is retained in its retracted position by a latch member 5 biased by a spring 6 of a latching device 7 into an annular groove 8 formed in said piston.

A spring 9 disposed in a coaxial recess 10 in power delivery piston 4 is compressed between a closed end of said piston adjacent an open end of cylinder 3 through which said piston may be extended, and a closure cap 11 at the opposite end of said casing. Spring 11 is calibrated such that, in the absence of any other pressure acting on piston 4, said spring provides just enough force to extend said piston out of cylinder 2 to a normal running position, indicated by broken outline 12, in which running position the brake shoe is maintained in running contact with the wheel for keeping the running surface of the wheel free of foreign material such as snow and ice, for example, without exerting any braking effect on the wheel.

The brake unit embodying the invention further comprises a hydro-pneumatic converter device 13 mounted on the power actuator device 1 in an axially vertical disposition relative to said power actuator device.

Converter device 13 comprises a casing having an upper section 14 and a lower section 15 by which the device is mounted to power actuator device 1, said upper section having formed therein a hydraulic fluid reservoir or chamber 16. Upper section 14 also has an internally coaxially disposed guide portion 17 extending downwardly toward casing section 15 from the bottom side of a separating wall 18 forming the bottom of reservoir 16, said guide portion having a coaxial passageway 19 extending therethrough with the upper end thereof opening into reservoir 16.

A power input piston 20 is coaxially vertically operable in the converter device 13, said power input piston being of the diaphragm type having the outer periphery thereof sealingly clamped between the two casing sections 14 and 15. Power input piston 20, in cooperation with that portion of upper casing section 14 below separating wall 18, forms a pneumatic pressure control chamber 21 adjacent the upper side of said piston, and in cooperation with lower casing section 15, defines a spring chamber 22 adjacent the under side of said piston. Pneumatic pressure chamber 21 is connectable via a port 23 to a source of control pneumatic pressure, whereas spring chamber 22 is vented to atmosphere via a vent 24.

Piston 20 is provided with a coaxial guide stem 25 extending from the lower side of said piston and having a coaxial bore 26 extending therethrough with a constriction 27 formed approximately at the axial midpoint thereof to divide said bore into upper and lower portions. The upper portion of bore 26 of piston 20 is sealingly guided on guide portion 17 of casing section 14, which is telescopically disposed in said upper portion of bore 26, during axial movement of power input piston 20, while the lower portion of guide stem 25 is also telescopically sealingly disposed in a bore 28 formed in a reduced diameter lower portion 29 of lower casing section 15 by which the hydro-pneumatic converter device 13 is mounted to the power actuator device 1. Bore 28, along with the lower end of guide stem 25 and the adjacent portion of cylinder 2, define a hydraulic pressure chamber 30 into which the lower end of bore 26 of guide stem 25 opens and which chamber is connected to a pressure side 31 of power delivery piston 4 via a passageway 32 formed in said cylinder.

Power input piston 20 is normally urged toward a release position, in which it is shown in the drawing, by a spring 33 compressedly disposed in spring chamber 22.

A valve member 34 is operably disposed in the lower portion of bore 26 in guide stem 25 of power input piston 20. Valve member 34 is provided with an annular valve element 35 at its upper end adjacent the lower end of guide portion 17 and an axially extending spacer pin 36, which is normally biased into abutting contact with said lower end of said guide portion by a spring 37 in the release position of power input piston 20, for maintaining said valve member and, therefore, said valve element in a spaced apart and unseated position relative to a valve seat 38 formed on the adjacent area of constriction 27. In the unseated position of valve member 34, hydraulic fluid may flow from reservoir 16, through passageway 19, past unseated valve element 35, through passageways 39 and 40 formed in said valve member, into hydraulic chamber 30 and to the pressure side 31 of power delivery piston 4 via passageway 32, thereby filling all spaces or volumes below said reservoir with hydraulic fluid.

When a brake application is initiated, pneumatic chamber 21 is supplied with pneumatic control fluid at a pressure commensurate with the degree of brake application desired, the details of the manner in which such pneumatic fluid is supplied not being deemed essential to an understanding of the invention. With the adjacent side of power input piston 20 subjected to pneumatic fluid at a selected pressure, said piston is moved downwardly, as viewed in the drawing, against the opposing force of spring 33 to an application position in which valve seat 38 comes into sealing contact with valve element 35, whereupon valve member 34 is carried downwardly with said piston until pin 36 is also moved out of contact with the lower end of guide portion 17. With valve 35 closed, further flow of hydraulic fluid in either direction is prevented, and the force of pneumatic pressure acting on the upper side of power input piston 20 is transmitted to the hydraulic fluid trapped below valve 35 and thereby converted to a hydraulic force. Because the pneumatic area of the upper side of power input piston 20 adjacent pneumatic chamber 21 is much greater relative to the hydraulic area of said piston on the lower side thereof adjacent hydraulic chamber 30, the force transmitted to the hydraulic fluid and therethrough to power delivery piston 4 is amplified according to the relative areas at the opposite ends of said power input piston. Power delivery piston 4, in turn, applies such force to a brake shoe 41 acting on a wheel 42. As was hereinbefore noted, shoe 41 is normally in running contact with wheel 42, and, therefore, the amount of travel of power delivery piston 4 for any given occasion of brake application is negligible but gradually increases as the shoe and wheel wear during a number of successive brake applications.

When a brake release is effected, pneumatic pressure is vented from pneumatic chamber 21, whereupon spring 33 is rendered effective for restoring power input piston 20 to its release position, above described, in which valve 35 is unseated from valve seat 38 to reestablish communication between hydraulic reservoir 16 and the volumes or spaces therebelow to cause such volumes or spaces to be refilled with hydraulic fluid. Thus, if more hydraulic fluid is required to refill such volumes or spaces after an application to compensate for further travel of power delivery piston 4 due to wear on the brake shoes or wheels or to replace any fluid that may have been lost through leakage, hydraulic fluid may readily flow by gravity and without hindrance from reservoir 16 through the flow path above described. Thus, the brake unit is automatically adjusted after each brake application.

Due to the vertical disposition of the converter device 13, the chances of air pockets being formed or of air being trapped in any space below reservoir 16 is highly improbable. Moreover, if an air pocket should inadvertently develop, such air may readily escape by rising up through the hydraulic fluid past the unseated valve 35, through passageway 19, reservoir 16 and vent ports 43 and 44 formed in a filler cap 45 through which reservoir 16 may be replenished with hydraulic fluid.

It will be noted that recess 10 in power delivery piston 4 is purposely tapered so that any air pocket that might form therein will travel along the upper sloped surface of said recess, as viewed in the drawing, toward the open end and thence into passageway 32, which also is formed at such an angle relative to the axis of cylinder 2 as to allow air to travel therein toward hydraulic chamber 30 thence to atmosphere, as above described.

Having now described the invention what we claim as new and desire to secure by Letters Patent, is:

1. Slack adjuster apparatus for a hydraulically actuable vehicle brake unit, said apparatus comprising the combination of:
   a. a power actuator device including a cylindrical casing mountable in a horizontal position;
   b. a power delivery piston coaxially operable in said cylindrical casing responsively to hydraulic pressure acting on one side thereof for exerting a brake applying force; and
   c. a converter device mounted in a vertical position on and above said power actuator device, said converter device comprising:
      i. a sectionalized casing having formed therein and at the upper end thereof an atmospherically vented hydraulic fluid storage chamber and at the lower end thereof a hydraulic pressure chamber in constant communication with said one side of said power delivery piston, and
      ii. power input piston means coaxially disposed in said sectionalized casing between said hydraulic fluid storage chamber and said hydraulic pressure chamber and having passage means extending therethrough through which said hydraulic fluid storage chamber may be communicated with said hydraulic pressure chamber,
      iii. said power input piston means normally occupying a release position in which communication through said passage means between said hydraulic fluid storage chamber and said hydraulic pressure chamber is open, and being operable in response to a control pressure force acting on a control pressure side thereof, to an application position in which said communication through said passage means is cut off and said control pressure force is transmitted by said power input piston means to said one side of said power delivery piston through hydraulic fluid in said hydraulic pressure chamber for generating said brake applying force.

2. Slack adjuster apparatus, as set forth in claim 1, wherein said power input piston means includes a valve member coaxially operably disposed in said passage means, said valve means being operative, upon operation of said power input piston means to its said release position, to an open position in which communication through said passage means is open, and being operable, upon operation of said power input piston means to its said application position, to a closed position in which said communication is closed.

3. Slack adjuster apparatus, as set forth in claim 1, wherein said power input piston means includes biasing means for restoring the power input piston means to its said release position upon relief of pneumatic pressure acting on said pneumatic pressure side thereof.

4. Slack adjuster apparatus, as set forth in claim 1, wherein said power input piston means comprises a power input piston having said passage means coaxially extending therethrough and having said control pressure side disposed at one end thereof and a hydraulic pressure side disposed at the opposite end thereof adjacent said hydraulic pressure chamber, the effective pressure area of said pneumatic pressure side being greater than that of said hydraulic pressure side.

5. Slack adjuster apparatus, as set forth in claim 1, wherein said cylindrical casing has a passageway formed therein for communicating said hydraulic pressure chamber with said one side of said power delivery piston, said passageway being sloped upwardly in a direction from said one side of said power delivery piston toward said hydraulic fluid chamber.

6. Slack adjuster apparatus, as set forth in claim 1, wherein said power actuator device comprises a biasing spring coaxially compressed in a spring recess coaxially formed in said power delivery piston for causing the power delivery piston, in the absence of hydraulic pressure acting on said one side thereof, to exert a precalibrated force sufficient for maintaining said power delivery piston in a non-braking position, said spring recess being open at one end to said one side of the power delivery piston and closed at the opposite end and being uniformally tapered from the one end to the closed end thereof.

7. Slack adjuster apparatus, as set forth in claim 1, wherein said power actuator device includes manually latchable and releasible latching means for latching said power delivery piston in a retracted position within said cylindrical casing.

8. Slack adjuster apparatus for use in a pneumatically controlled hydraulically actuated truck-mounted brake unit for applying and releasing braking force to and from a brake shoe of a railway vehicle wheel, said apparatus comprising:

a. a power actuator device including a cylindrical casing mountable on the truck in a horizontal position;

b. a power delivery piston coaxially operable in said cylindrical casing responsively to hydraulic pressure acting on one side thereof for applying braking force to the brake shoe; and c. a hydro-pneumatic converter device mounted in a vertical position on and above said power actuator device, said hydro-pneumatic converter device comprising:

i. a sectionalized casing having formed therein and at the upper end thereof an atmospherically vented hydraulic fluid storage chamber and at the lower end thereof a hydraulic pressure chamber in constant communication with said one side of said power delivery piston, and ii. power input piston means coaxially disposed in said sectionalized casing between said hydraulic fluid storage chamber and said hydraulic pressure chamber and having coaxial passage means formed therein through which said hydraulic fluid storage chamber may be communicated with said hydraulic pressure chamber, iii. said power input piston means normally occupying a release position, in which communication through said passage means is open, and being operable, in response to a pneumatic pressure force acting on a pneumatic pressure side thereof, to an application position in which communication through said passage means is cut off and said pneumatic pressure force is transmitted by said power input piston means to said one side of said power delivery piston through said hydraulic fluid in said hydraulic pressure chamber for generating said brake applying force.

* * * * *